United States Patent [19]

Tomita

[11] 4,012,022
[45] Mar. 15, 1977

[54] BREAKAWAY MIRROR MOUNTING

[75] Inventor: Itsuo Tomita, Hiratsuka, Japan

[73] Assignee: Ichikoh Industries Limited, Tokyo, Japan

[22] Filed: Aug. 11, 1975

[21] Appl. No.: 603,283

[30] Foreign Application Priority Data

Aug. 12, 1974 Japan .............................. 49-91532
Aug. 12, 1974 Japan .............................. 49-91531

[52] U.S. Cl. .............................. 248/475 A; 248/481
[51] Int. Cl.² .............................................. A47F 7/14
[58] Field of Search ............ 248/475 A, 475 B, 476, 248/479, 481; 24/208 A, 201

[56] References Cited

UNITED STATES PATENTS

| | | | |
|---|---|---|---|
| 3,130,464 | 4/1964 | Barlow | 24/208 A |
| 3,544,259 | 12/1970 | Fujita | 248/475 A |
| 3,596,867 | 8/1971 | Allander | 248/475 A |
| 3,703,270 | 11/1972 | Tomlin | 248/475 A |
| 3,887,156 | 6/1975 | Hugonnier | 248/475 A |

FOREIGN PATENTS OR APPLICATIONS

| | | | |
|---|---|---|---|
| 953,321 | 11/1956 | Germany | 248/475 A |
| 1,134,353 | 11/1968 | United Kingdom | 248/475 A |
| 1,234,025 | 6/1971 | United Kingdom | 248/475 A |

*Primary Examiner*—Robert A. Hafer
*Attorney, Agent, or Firm*—Cushman, Darby & Cushman

[57] ABSTRACT

A breakaway mirror mounting for detachably attaching a rear view mirror device to the interior structure of a motor vehicle comprises a mirror supporting arm for attachment to a mirror at one end and having, at the other end, an upperfaced abutting surface provided with an engaging projection constituted by head and neck portions and a base plate of a synthetic resin having an accommodation opening for the engaging projection. The opening is provided with a pair of resilient engaging strips extending from a pair of opposite edges of the opening, leaving a gap slightly smaller in width than the head portion of the engaging projection.

5 Claims, 8 Drawing Figures

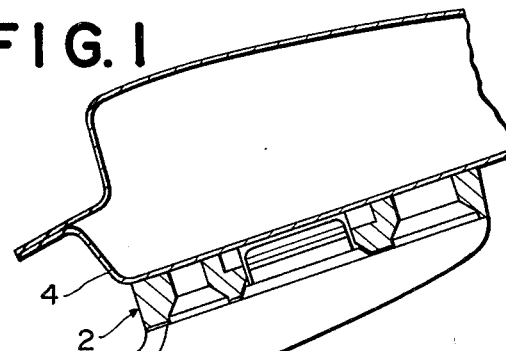
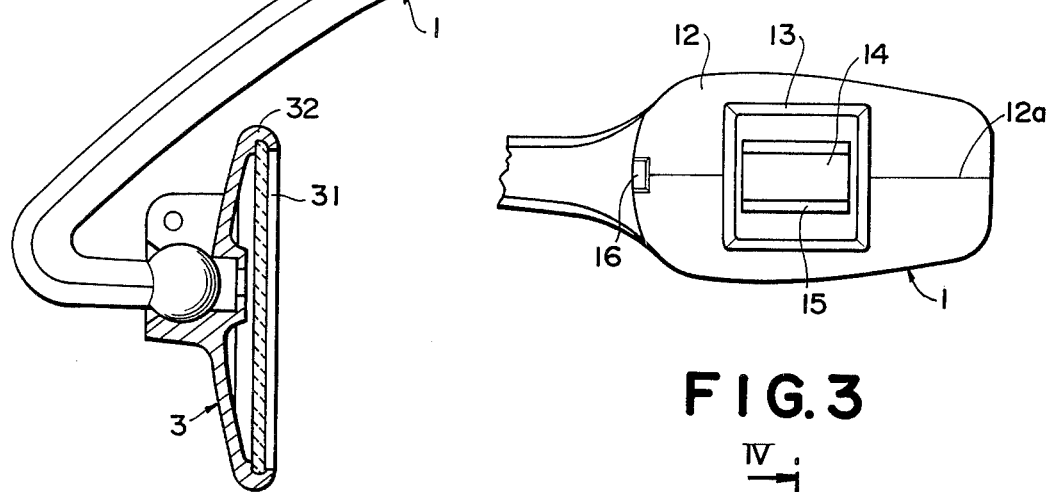
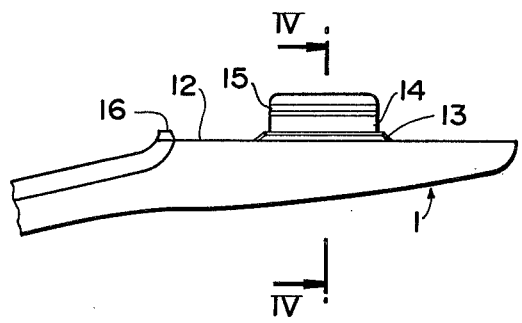
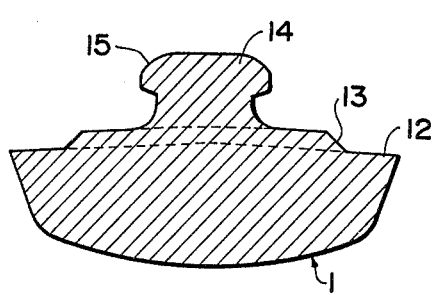

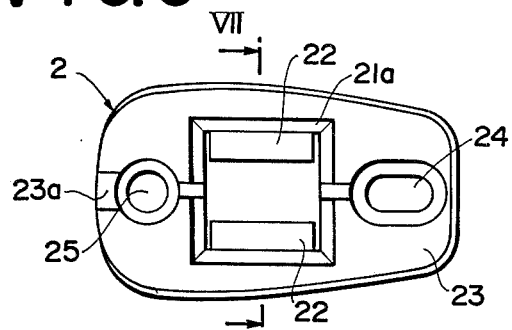
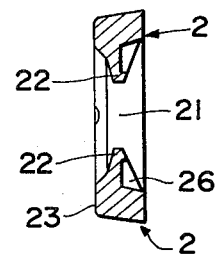
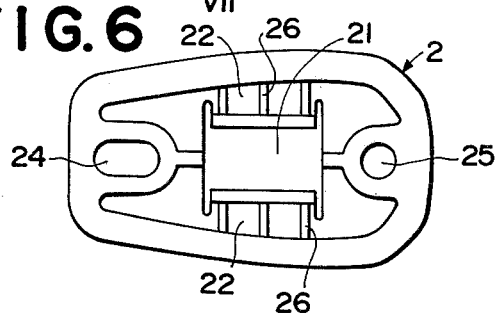
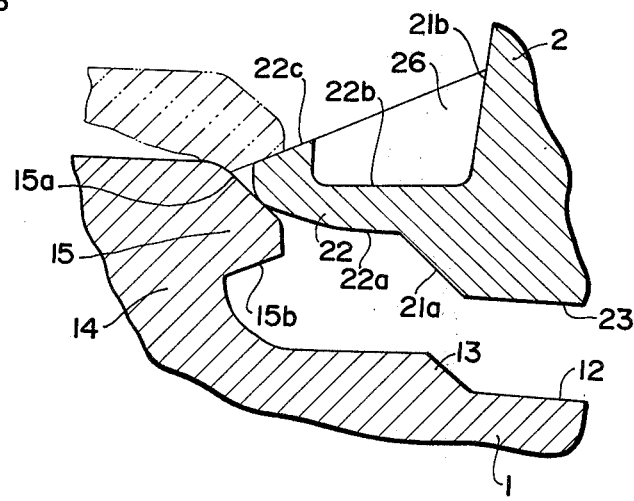

BREAKAWAY MIRROR MOUNTING

BACKGROUND OF THE INVENTION a. Field of the invention:

The present invention is concerned with a breakaway mirror mounting for detachably attaching a rear view mirror device to the interior structure of a motor vehicle.

b. Description of the prior art:

A known rear view mirror device to be attached in breakaway fashion comprises a mirror supporting arm member and a base member secured to the body of a motor vehicle. One or more projections are provided on that surface of one of the two members which is to abut on the surface of the other member on which one or more accomodation holes for the projections are formed. The known rear view mirror device is detachably attached to the body of a motor vehicle via the base member by engaging the projections and accomodation holes with each other.

One of such known rear view mirror devices has been proposed in U.S. Pat. No. 3,703,270 to Tomlin et al. In Tomlin, an arm of the mirror is attached to a bracket by means of a ball-shaped joint which permits it to pivot and is held in place by a ring or socket cavity. The breakaway force of this construction can be adjusted by modifying the grade of the resilient plastics material of which the construction is made, the position of an annular recess surrounding the ring for holding the ball-shaped joint and the number and position of radial webs provided on the peripheral wall of the ring. The difficulty with this type of device is that the molding of members constituting the device is rather difficult and that it is therefore difficult to arrange the structure such that the amount of force which causes the mirror to break away can be easily determined in advance. As a result, it is difficult to make sure that that force will be uniform for each such apparatus produced. This is particularly important since detachment of the mirror, except under emergency conditions, can be very dangerous and at the very least might be inconvenient. On the other hand, failure of the mirror to properly detach could have disastrous conditions. Accordingly, it is extremely important to be able to determine easily and accurately the amount of force required for breakaway.

SUMMARY OF THE INVENTION

It is therefore a primary object of the present invention to provide a breakaway mirror mounting for detachably attaching a rear view mirror device to the interior structure of a motor vehicle, which mounting behaves so that, whenever a rear view interior mirror device attached to the interior structure of the motor vehicle by means of this mounting is subjected to a considerably great impact, the mirror device as a whole will be caused to readily detach from the interior structure of the motor vehicle without breaking the mirror supporting arm.

Another object of the present invention is to provide a breakaway mirror mounting of the type described which permits an easy determination of the magnitude of resistance to breakaway force, so that whenever a shock greater than predetermined magnitude is applied to the rear view mirror device, the mounting unfailingly detaches the mirror device.

Still another object of the present invention is to provide a breakaway mirror mounting of the type described which stably attaches the rear view mirror device to the interior structure of a motor vehicle without assistance of special supporting means for the mirror supporting arm.

Yet another object of the present invention is to provide a breakaway mirror mounting of the type described which can be easily attached to a supporting surface of the interior structure of a motor vehicle, thereby facilitating attachment operation of the rear view mirror device to the vehicle structure.

A further object of the present invention is to provide a breakaway mirror mounting of the type described which is unexpensive in manufacturing, easy to assemble and detach to the interior structure of a motor vehicle and simple in construction.

Still a further object of the present invention is to provide a breakaway mirror mounting of the type described which effectively prevents vibration of the rear view mirror during running operation of the motor vehicle carrying the breakaway mirror mounting and the rear view mirror device.

According to the present invention, a breakaway mirror mounting for detably attaching a rear view mirror device to the interior structure of a motor vehicle comprises a mirror supporting arm for attachment to a mirror at one end, a base plate made of a synthetic resin which is to be secured to the interior structure and means for detaching the mirror and the mirror supporting arm as a whole from the interior structure upon application of force greater than predetermined magnitude to the mirror supporting arm, that said means for detaching the mirror and the mirror supporting arm comprising a engaging projection provided on the other end of the mirror supporting arm and which is constituted by a head portion and a neck portion and an accomodation opening provided through the base plate and having a pair of resilient engaging strips extending from edges of said opening with a gap smaller in width than said head portion left between said strips, said strips being given resiliency sufficient for allowing said head portion to pass through said gap and being given a configuration which fits part of said head portion and said neck portion.

These and other objects as well as features of the present invention will become apparent in the following detailed description when taken in conjunction with the accompanying drawing.

BRIEF DESCRIPTION OF THE DRAWINGS

FIG. 1 is a side view, partly shown in section, of a rear view mirror assembly having a breakaway mirror mounting according to the present invention.

FIG. 2 to 4 show a part of a mirror supporting arm of the breakaway mirror mounting; FIG. 2 is a plan view of the same, FIG. 3 is a side view of FIG. 2, and FIG. 4 is a sectional view on an enlarged scale taken along the line IV—IV in FIG. 3. FIGS. 5 to 7 show a base plate of the breakaway mirror mounting; FIG. 5 is a bottom view of the same, FIG. 6 is a plan view of the same, and FIG. 7 is a sectional view taken along the line VII—VII in FIG. 5.

FIG. 8 is an explanatory illustration showing, in section, the way to engage the mirror supporting arm with the base plate.

DETAILED DESCRIPTION OF PREFERRED EMBODIMENT

Referring to FIG. 1, a rear view mirror assembly for interior use having a breakaway mirror mounting according to the present invention comprises a mirror supporting arm 1 and a base plate 2. A mirror section 3 is adjustably carried by an end of the mirror supporting arm by means of a ball-and-socket joint. The other end of the mirror supporting arm 1 is securely supported by the base plate 2 fastened to the interior structure 4 of a motor vehicle at a cite above the windshield.

The mirror section 3 is comprised of a mirror 31 and a mirror holder 32. On the rear face of the mirror holder 32 is provided a socket which receives a ball formed on one end of the mirror supporting arm 1 to rotatably hold the mirror section 3.

The mirror supporting arm 1 extends from the rear face of the mirror holder 32 and then curves to pass beyond the mirror section 3.

Referring now to FIGS. 2 to 4, the other end of the arm 1 is formed with an abutting surface 12 which is to abut on a surface of the base plate 2 when they are engaged with each other. A platform 13 is provided on the central portion of the abutting surface 12. The platform 13 is given a rectangular configuration when viewed from directly thereabove and the four lateral sides of the platform 13 are slanted toward the center of the upper surface of the platform.

On the platform 13 is provided an engaging projection 14 which is also given a rectangular configuration when viewed from directly thereabove. The engaging projecton 14 is constituted by a head portion and a neck portion. It will be understood that the head and neck portions each are substantially rectangular. The neck portion stands upright on the platform 13 and the head portion having a larger size than that of the neck portion is located on the neck portion. The head portion constitutes a pair of lateral protrusions 15 along the longitudinal opposite edge of the rectangular configuration of the engaging projection 14. As a result, the secton of the head and neck portions presents a T-shape as shown in FIG. 4. The upper surfaces of the lateral protrusions 15 are gradually sloping from the side edges toward the top of the engaging projection 14, as is best seen in FIG. 4. The lower surfaces of the lateral protrusions 15 slant toward the root or neck of the engaging projection 14, forming an angle of about 20 degrees with respect to the abutting surface 12, also, as is best seen in FIG. 4.

Referring to FIGS. 5 to 8, the base plate 2 is made of a synthetic resin excellent in shock resistance such as polyacetal. Through the central portion of the base plate 2 is formed an accomodation opening 21 for the engaging projection 14. Four slanting surfaces 21a defining the accomodation opening 21 are formed on the bottom or supporting surface 23 of the base plate 2 correspondingly to the slanting side surfaces of the platform 13.

A pair of resilient engaging strips 22 extends from a pair of sides of the accomodation opening 21 with a gap smaller in width than the head portion left between these strips. The strips are given resiliency sufficient for allowing the head portion to pass through the gap. The lower surfaces 22a of the resilient engaging strips 22 extend continuously from two of the slanting surfaces 21a, presenting gradual upward curvedness, as is best seen in FIG. 8. The upper surfaces 22b of the engaging strips 22 are substantially perpendicular to the inner walls 21b of the opening 21. The connection between the inner wall 21b and the upper surface 22b is arranged to be located outwardly of the location of the connection between the slanting surface 21a and the lower surface 22a. The extremity of the engaging strips are bulging upwardly and the upper surface of the bulging extremity constitute an engaging surface 22c. The engaging surface 22c inclines inwardly of the opening 21 to form an angle of about 20° with respect to the supporting surface 23. The level of the engaging surface 22c is designed such that the engaging surface 22c is brought into close contact with the lower surface of the mating lateral protrusion 15 when the slanting surfaces 21a abut on the slanting side surfaces of the platform 13.

The distance between the extremities of the engaging strips 22 is arranged to be slightly smaller than the distance between the extremities of the lateral protrusions 15 to ensure that the engaging projection 14 snugly fits between the engaging strips 22.

Two through holes 24 and 25 are provided through the base plate 2. The base plate 2 can be secured to the interior structure of a motor vehicle by fastening screws through the through holes 24 and 25. The through hole 25 is given an elongated configuration in order to compensate dimensional errors and to allow the base plate to be attached to various types of motor vehicles.

For attaching the mirror supporting arm 1 to the interior structure of a motor vehicle, the engaging projection 14 of the arm 1 is forced into the accomodation opening 21 of the base plate 2 which has been secured to the structure of a motor vehicle, so that the lateral protrusions 15 are engaged with the mating engaging strips 22 to attach the arm 1 to the base plate 2. During this assembling operation, the lateral protrusions 15 can easily get over the engaging strips 22 because the lower surfaces 22a of the engaging strips 22 are given progressive upward curvedness and because the upper surfaces of the lateral protrusions 15 are given inclination. Moreover, the connection between the upper surfaces 22b of the engaging strips 22 and the inner walls 21b of the accomodation opening 21 is located outwardly of the location of the connecton between the slanting surfaces 21a and the lower surfaces 22a so as to impart more thickness to the bottom side of the engaging strips 22. As a result, the strips 22 are easily bent upwardly to make easy the forcing of the projecton 14 into the opening 21.

Once the lateral protrusion has got over the engaging strips 22, the slanting side surfaces of the platform 13 are caused to abut on the slanting surfaces 21a of the accomodation opening and at the same time the engaging surfaces 22c are caused to engage with the lower surfaces of the lateral protrusions 15 of the engaging projection 14. Due to the abutment of the slanting side surfaces of the platform 13 and the slanting surfaces 21a, relative movement between the arm 1 and the base plate 2 is effectively prevented. Since both the lower surfaces of the lateral protrusions 15 and the engaging surfaces 22c of the engaging strips 22 are given inclination, the mirror supporting arm 1 receives upward force created by the returning movement of the resilient engaging strips 22 and is stably and securely hold. Furthermore, with the specific construction in thickness of the resilient engaging strips 22, it is difficult for the strips 22 to be bend downwardly, so that the strips have great supporting force. As a result, the strips can effectively prevent vibration of the mirror which might be caused during running operation.

In case an external force greater in magnitude than a predetermined value is applied to the mirror 3 or the arm 1, the engaging projection 14 will immediately detach out of the accomodation opening 21 and the mirror 3 and the arm 1 as a whole will break away from the base plate 2. In the breakaway, a part of the edge of the abutting surface 12 will act as fulcrum. If such an external force is substantially great, the strips 22 may be broken and the mirror 3 and the arm 1 as a whole will break away from the base plate 2 instantaneously.

The abutting surface 12 of the mirror supporting arm 1 is bisected by a ridge line 12a extending longitudinally of the abutting surface 12. The two planes on either side of the ridge line 12a are each inclined downwardly by about 2°. On the other hand, the bottom of supporting surface 23 of the base plate 2 is bisected a continual groove 23a extending longitudinally and centrally of the supporting surface 23 and the two planes on either side of the groove 23a are correspondingly inclined downwardly by about 2°. In other words, the two planes of the abutting surface 12 form an angle more than 180° therebetween, while the two planes of the supporting surface 23 form an angle less than 180° therebetween. These planes are arranged such that the sum of the included angles of these planes is equal to 360°.

Due to the arrangement as above, it becomes very easy to bring the abutting surface 12 and the supporting surface 23 into close contact by merely having the ridge line 12a and the groove 23a coincide. Moreover, even if there is produced dimensional error between the engaging projection 14 and the resilient engaging strips, the close contact between the abutting surface 12 and the supporting surface 23 both formed as described above effectively prevents rotation and/or vibration of the mirror supporting arm 1.

In general, the mirror supporting arm 1 is a die-cast article and is molded by the use of a mold with a parting line coinciding with the longitudinal center line of the arm. Therefore, an undesirably casting fin is usually left along the parting line, i.e. the ridge line 12a. If it is desired to trim such a casting fin, the abutting surface 12 and the platform 13 are often damaged. However, according to the present invention, the groove 23a is provided on the suporting surface 23 of the base plate 2 to receive the casting fin therein and therefore the troublesome trimming operation is not necessary. Needless to say, the arrangment is such that the axial line of the engaging projection 14 and that of the accomodating, opening 22 coincide with each other when the abutting surface 12 and the supporting surface 23 are brought into close contact.

At a part of the edge of the abutting surface 12 of the mirror supporting arm 1 is provided a small projecton 16 which is to be accomodated in the groove 23a on the base plate 2 so as to serve for determining the relative position of the arm 1 and the base plate 2 and to nonrotatably hold the arm 1.

As seen in FIG. 8, a plurality of stiffener ribs 26 may be provided on the upper side of the resilient engaging strips 22. Also as is best seen in FIG. 8, the end surface of the innermost side of the engaging strip 22 may be given inclination such that the end surface is inclined toward the center of the opening as it goes downwards, so as to facilitate the engagement of the projection and the strips.

As has been explained, the breakaway mirror mounting according to the present invention can detachably attach a rear view mirror device to the interior structure of a motor vehicle.

Moreover, according to the invention, the magnitude of resistance of the mounting to breakaway force can be easily determined by modifying the material or shape of the base plate or by modifying the number of the stiffener ribs.

It will be understood that the mounting of the invention permits an easy attachment of the mirror supporting arm to the base plate and that the mounting of the invention can effectively prevent vibration of the mirror supporting arm due to the presence of the mating slanting surfaces.

It should be understood that the foregoing relates to only a preferred embodiment of the present invention, and that the present invention is not limited thereto except as defined in the appended claims.

What is claimed is:

1. A breakaway mirror mounting for detachably attaching a rear view mirror device to the interior structure of a motor vehicle comprising:
   a mirror;
   a mirror supporting arm having said mirror attached at one end of said arm;
   a synthetic resin base plate having upper and lower surfaces and constructed for the upper surface to be secured to the interior structure of a motor vehicle; and
   means for detaching the mirror and the mirror supporting arm as a whole from the base plate upon application of a force greater than a predetermined magnitude to the mirror supporting arm;
   said means for detaching the mirror and the mirror supporting arm comprising an abutting surface provided on the other end of the mirror supporting arm, a supporting surface provided on said lower surface of the base plate, a platform provided on said abutting surface, an engaging projection including a head portion and a neck portion extending from said platform, said base plate having therethrough an accommodation opening partially formed by inner walls, and a pair of resilient engaging strips each extending from opposing edges of said accomodation opening and being separated from each other at their adjacent ends to define between them a gap smaller in width than said head portion, said strips having a configuration corresponding to that of said head portion;
   said accommodation opening being formed with slanting surfaces along its lower side edges;
   said platform having side surfaces slanting at an angle corresponding to the slanting angle of the slanting surfaces of said opening;
   said head portion of said engaging projection having on opposite edges respective lateral protrusions, the upper surface of each said protrusion gradually sloping upwardly toward the top portion of the engaging projection;
   said engaging strips having upper and lower surfaces, said upper surface including a portion extending from the inner walls substantially at a right angle, said lower surface being comprised of an upwardly sloping portion and connected thereto at its lower end to said slanting surface and a supporting surface continuously connected to the slanting surface at the lower end of the slanting surface to cause the lower surface to present a gradual upward curvedness so as to impart more thickness to the bottom side of the strip near the inner walls, the connection between the inner walls and the upper surface portion being located outwardly of the connection between the slanting surface and the lower surface portion, for causing the resilient engaging strips to bend at the connection between the slanting surface and the lower surface portion, upon the insertion of said engaging projection into said accommodation opening, to expand said gap so that the strips permit the insertion of the projection and hold the same by its lateral protrusions.

2. A breakaway mirror mounting according to claim 1 in which said abutting surface comprises two adjoining slanting surfaces disposed at a given angle to form a ridge along their adjoining line and in which the supporting surface comprises two other adjoining slanting surfaces having an angle complementing said given angle of the said slanting surfaces of the abutting surface.

3. A breakaway mirror mounting according to claim 1 in which the inner end of the engaging strips projecting upwardly, the upper surface of which having an inclination toward the inner side of the accommodation opening.

4. A breakaway mirror mounting according to claim 1 in which a stiffener rib is provided on the upper side of each engaging strip.

5. A breakaway mirror mounting according to claim 1 in which a further projection is provided on the abutting surface and in which a groove is provided on the supporting surface to receive said further projection.

* * * * *